United States Patent
Kwon et al.

(10) Patent No.: US 9,967,899 B2
(45) Date of Patent: May 8, 2018

(54) METHOD AND APPARATUS FOR CONTROLLING AN UPLINK TRANSMISSION POWER RATIO IN A MOBILE COMMUNICATION SYSTEM

(75) Inventors: Hwan-Joon Kwon, Gyeonggi-do (KR); Dong-Hee Kim, Seoul (KR); Youn-Sun Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1011 days.

(21) Appl. No.: 12/431,457

(22) Filed: Apr. 28, 2009

(65) Prior Publication Data
US 2009/0215485 A1  Aug. 27, 2009

Related U.S. Application Data

(63) Continuation of application No. 10/794,992, filed on Mar. 5, 2004, now abandoned.

(30) Foreign Application Priority Data

Mar. 5, 2003  (KR) ................................. 13838/2003
Aug. 30, 2003  (KR) ................................. 60631/2003

(51) Int. Cl.
  *H04M 1/00* (2006.01)
  *H04W 72/12* (2009.01)
  (Continued)

(52) U.S. Cl.
  CPC ......... *H04W 72/1289* (2013.01); *H04L 47/10* (2013.01); *H04W 52/146* (2013.01); *H04W 52/16* (2013.01); *H04W 52/325* (2013.01)

(58) Field of Classification Search
  USPC ........... 455/422.1, 450–453, 522; 370/310.2, 370/318, 328
  See application file for complete search history.

(56) References Cited

U.S. PATENT DOCUMENTS 5,396,516 A    3/1995  Padovani et al.
5,526,399 A    6/1996  Kameda
(Continued)

FOREIGN PATENT DOCUMENTS

CA    2 437 724    8/2002
EP    1 067 705    1/2001
(Continued)

OTHER PUBLICATIONS

B. P. Lathi, Modern Digital and Analog Communication Systems, Holt, Rinehart and Winston Publishers, 1983, pp. 194-200.*

*Primary Examiner* — Steve D'Agosta
(74) *Attorney, Agent, or Firm* — The Farrell Law Firm, P.C.

(57) ABSTRACT

A method and apparatus for controlling an uplink transmission power in a mobile station of a mobile communication system. The method includes transmitting uplink data in a first transmission interval, receiving a transmission power control information over a downlink control channel, and determining a transmission power of uplink data to be transmitted in a second transmission interval. The transmission power is determined based on the received transmission power control information and a transmission power of the uplink data transmitted in the first transmission interval. The first transmission interval and the second transmission interval are included in a same Hybrid Automatic Retransmission reQuest (HARQ) process.

12 Claims, 9 Drawing Sheets

(51) Int. Cl.
    *H04L 12/801*    (2013.01)
    *H04W 52/14*    (2009.01)
    *H04W 52/16*    (2009.01)
    *H04W 52/32*    (2009.01)

(56)            References Cited

U.S. PATENT DOCUMENTS

| | | | |
|---|---|---|---|
| 5,603,096 A * | 2/1997 | Gilhousen et al. | 455/69 |
| 5,828,677 A | 10/1998 | Sayeed et al. | |
| 5,982,760 A * | 11/1999 | Chen | 370/335 |
| 5,995,496 A | 11/1999 | Honkasalo | |
| 6,173,162 B1 * | 1/2001 | Dahlman et al. | 455/69 |
| 6,343,206 B1 | 1/2002 | Miya et al. | |
| 6,658,262 B1 * | 12/2003 | Lundborg | 455/522 |
| 6,700,867 B2 | 3/2004 | Classon et al. | |
| 6,741,862 B2 | 5/2004 | Chung et al. | |
| 7,068,627 B2 | 6/2006 | Koo et al. | |
| 7,126,965 B2 | 10/2006 | Sugisaki | |
| 7,143,330 B2 * | 11/2006 | Ahn et al. | 714/748 |
| 7,158,504 B2 | 1/2007 | Kadaba et al. | |
| 7,161,916 B2 | 1/2007 | Malladi et al. | |
| 2001/0010686 A1 | 8/2001 | Kubo et al. | |
| 2002/0060997 A1 * | 5/2002 | Hwang | 370/335 |
| 2002/0181410 A1 | 12/2002 | Bae et al. | |
| 2003/0054807 A1 | 3/2003 | Hsu et al. | |
| 2003/0063595 A1 * | 4/2003 | You et al. | 370/342 |
| 2004/0137931 A1 * | 7/2004 | Sarkar et al. | 455/522 |
| 2004/0179557 A1 | 9/2004 | Tong et al. | |

FOREIGN PATENT DOCUMENTS

| | | |
|---|---|---|
| EP | 1 244 240 | 9/2002 |
| EP | 1 246 384 | 10/2002 |
| EP | 1 241 901 | 6/2004 |
| IN | 2658/DELNP/2005 | 3/2007 |
| IN | 1935/CHENP/2005 | 11/2008 |
| IN | 1505/KOLNP/2005 | 1/2009 |
| IN | 146/KOLNP/2005 | 10/2009 |
| JP | 2002-524962 | 8/2002 |
| KR | 1020020076652 | 10/2002 |
| RU | 2114508 | 6/1998 |
| WO | WO 00/14900 | 3/2000 |
| WO | WO 01/48943 | 7/2001 |
| WO | WO 02/063781 | 8/2002 |
| WO | WO 2004/064426 | 7/2004 |
| WO | WO 2004/075593 | 9/2004 |
| WO | WO 2004/100404 | 11/2004 |
| WO | WO 2005/036773 | 4/2005 |

* cited by examiner

METHOD AND APPARATUS FOR CONTROLLING AN UPLINK TRANSMISSION POWER RATIO IN A MOBILE COMMUNICATION SYSTEM

PRIORITY

This application is a Continuation Application of U.S. application Ser. No. 10/794,992, which was filed on Mar. 5, 2004, now abandoned and claims priority under 35 U.S.C. § 119 to an application filed in the Korean Intellectual Property Office on Mar. 5, 2003 and assigned Serial No. 2003-13838, and an application filed in the Korean Intellectual Property Office on Aug. 30, 2003 and assigned Serial No. 2003-60631, the contents of all of which are incorporated herein by reference.

BACKGROUND OF THE INVENTION

1. Field of the Invention

The present invention relates generally to a mobile communication system, and in particular, to an interlaced rate control (IRC) method and apparatus for efficiently controlling reverse traffic.

2. Description of the Related Art

Generally, in a Code Division Multiple Access (CDMA) mobile communication system, multimedia service is supported using the same frequency band. Mobile stations simultaneously transmit data to a base station, and identification of the mobile stations is achieved through spreading codes uniquely assigned to the mobile stations.

Reverse data transmission from a mobile station to a base station is performed over a reverse packet data channel (R-PDCH) by the physical layer packet (PLP), and a packet length is fixed. A data rate is variable for each packet, and a data rate of each packet is controlled depending on a power of a mobile station transmitting the corresponding packet, a total amount of transmission data, and a rate control bit (RCB) provided from a base station over a forward rate control channel (RCCH).

A base station determines reverse rates of mobile stations using Rise over Thermal (RoT), which is a ratio of the total reception power to thermal noises, or a load obtained from signal-to-noise ratios (SNRs) of mobile stations in service. When RoT is used, a reverse rate of a mobile station is controlled so that RoT of the corresponding mobile station approaches a reference RoT, and when RoT is unavailable, a reverse rate of a mobile station is controlled so that a load of the corresponding mobile station approaches a reference load. That is, a base station determines whether to increase, decrease, or hold a data rate of each mobile station based on the RoTs of all mobile stations in service, the total amount of transmission data, and power status. If the rate of a mobile station is efficiently controlled, throughput of the entire system can be increased.

Information for the rate control of a mobile station determined by a base station is transmitted to the corresponding mobile station in the form of a reverse control bit (RCB). If an RCB value received from a base station is '+1' indicating 'rate up', a mobile station increases a reverse rate in the next transmission interval. If the RCB value is '−1' indicating 'rate down', the mobile station decreases the reverse rate in the next transmission interval. If the RCB value is '0' indicating 'rate hold', the mobile station holds the current reverse rate in the next transmission interval.

In certain systems, a base station controls a traffic-to-pilot power ratio (TPR) of a mobile station instead of controlling a data rate of the mobile station. In a conventional mobile communication system, reverse transmission of a mobile station is power-controlled by a base station. In the power control process, a mobile station directly controls power of the pilot channel according to a power control command received from a base station, and controls channels other than the pilot channel depending on the TPR, which has a fixed value. For example, if the TPR is 3 dB, this indicates that a power ratio of a traffic channel to a pilot channel transmitted by a mobile station is 2:1. Therefore, a mobile station determines a power gain of the traffic channel so that the traffic channel should be two times higher than the pilot channel in terms of power.

Even for other types of channels, a gain of the corresponding channel has a fixed value compared with a gain of a pilot channel. In a method of controlling TPR by a base station, in controlling reverse transmissions by a plurality of mobile stations of a base station through scheduling, a system informs TPR allowed for each mobile station instead of directly informing the scheduled result as a data rate. Here, TPR is increased according to an increase in a data rate. For example, if a data rate is increased two times, power assigned to a traffic channel by a mobile station is increased about two times, which means TPR is doubled.

In a conventional mobile communication system, a relationship between a data rate of a reverse traffic channel and TPR is previously known to a mobile station and a base station from an information table. In practice, therefore, controlling a data rate of a mobile station is equivalent to controlling a TPR of a mobile station. Herein, a description will be made of only a method for controlling a data rate of a mobile station by a base station.

Figure 1:
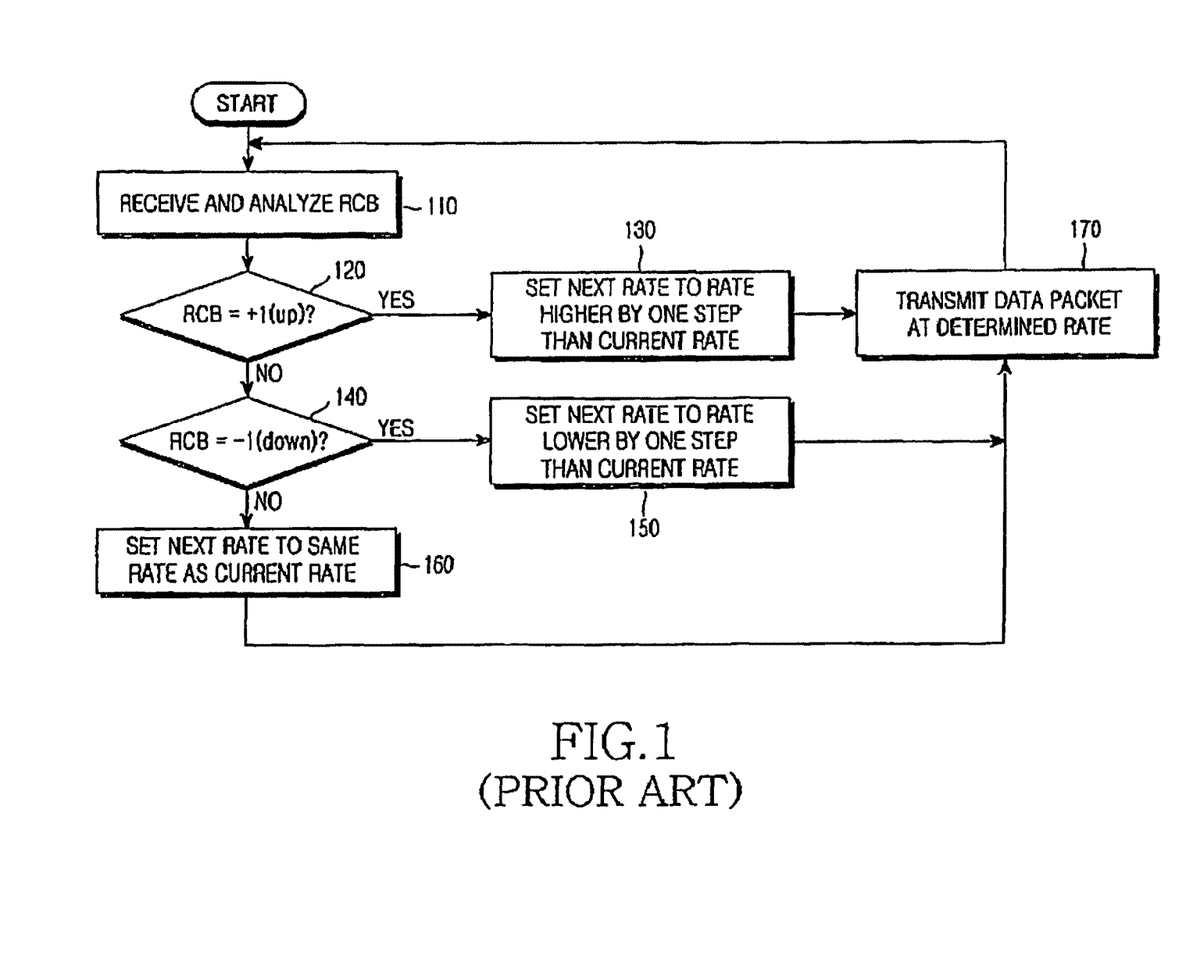
FIG. 1 is a flowchart illustrating an operation of determining a reverse rate by a mobile station according to the prior art.

FIG. 1 is a flowchart illustrating an operation of determining a reverse rate by a mobile station according to the prior art. The mobile station can support at least 9.6 Kbps, 19.2 Kbps, 38.4 Kbps, 76.8 Kbps, 153.6 Kbps, and 307.2 Kbps for R-PDCH, and increases, decreases, or holds a reverse rate step by step according to a rate control bit (RCB).

Referring to FIG. 1, in step 110, a mobile station receives a rate control bit (RCB) and analyzes the received rate control bit. In step 120, the mobile station determines whether a value of the rate control bit indicates 'rate up'. If a value of the rate control bit is '+1', indicating 'rate up', in step 130, the mobile station sets a rate to be used in the next time interval to a value (or rate) increased one step higher than a rate for the current time interval, and then proceeds to step 170.

However, if a value of the rate control bit is not '+1', indicating 'rate up', the mobile station determines in step 140 whether a value of the rate control bit indicates 'rate down'. If it is determined that a value of the rate control bit is '−1', indicating 'rate down', in step 150, the mobile station sets a rate to be used in the next time interval to a value decreased one step lower than a rate for the current time interval, and then proceeds to step 170.

However, if it is determined that a value of the rate control bit is not '−1', indicating 'rate down', in step 160, the mobile station sets a rate to be used in the next time interval to the same value as a rate for the current time interval. In step 170, the mobile station transmits a data frame in the next time interval according to the determined rate.

Figure 2:
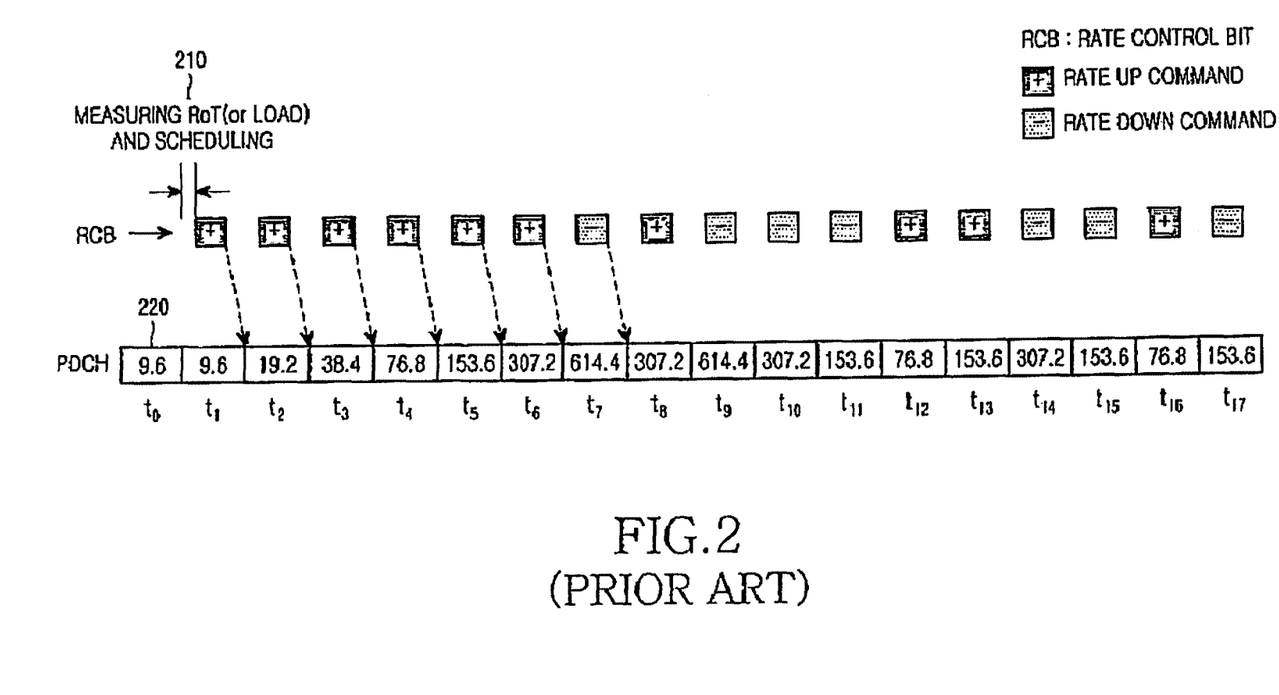
FIG. 2 is a timing diagram illustrating an operation of determining a reverse rate by a mobile station according to the prior art.

FIG. 2 is a timing diagram illustrating an operation of determining a reverse rate by a mobile station according to the prior art. The RCB is transmitted one time from a base station to a mobile station for each transmission interval.

The RCB is used to control a reverse rate of R-PDCH for the next transmission interval of a mobile station.

Referring to FIG. 2, in a time interval t0, a mobile station transmits a data frame over a packet data channel (PDCH) at a rate of 9.6 Kbps (see 210). In the time interval t1, a base station determines whether to increase, decrease, or hold a data rate of a mobile station in consideration of an RoT, a buffer status, and a power status of the corresponding mobile station, generates an RCB according to the determination result, and transmits the generated RCB to the mobile station (see 220). Then the mobile station receives the RCB, analyzes the RCB, and determines whether to increase, decrease, or hold a rate of PDCH in the next time interval t2.

However, in such a rate control method, due to a delay between a time where RCB is generated in a base station and a time where the RCB is actually applied in a mobile station, a base station cannot efficiently perform rate control on its mobile stations.

For example, in a time interval t5, a base station receives a data frame from a mobile station at a rate of 153.6 Kbps, and in the same time interval, the base station determines to increase a data rate of the mobile station by one step from the current rate of 153.6 Kbps according to conditions of other mobile stations, generates a corresponding RCB(+), and transmits the generated RCB(+) to the mobile station. Actually, however, because the RCB(+) is transmitted for a time interval t6, a time interval where the RCB(+) is actually applied becomes t7 taking into account a time required when the mobile station receives the RCB(+) and analyzes the RCB(+). As a result, in the time interval t7, the mobile station sets a rate 614.4 Kbps, which is increased one step higher than a rate 307.2 Kbps for the previous time interval t6.

When several mobile stations simultaneously transmit reverse data, data transmitted by other mobile stations acts as interference to a signal of a particular mobile station. Therefore, a base station performs a control operation in such a manner that all rates or all RoT values of data transmitted by mobile stations in the cell should not exceed a particular threshold. In this case, when the base station increases a data rate of a particular mobile station, the base station must decrease data rates of the other base stations. Accordingly, data throughputs of mobile stations receiving a data service from a particular base station depend upon the efficiency of the reverse rate control.

However, as illustrated in FIG. 2, a mobile station determines whether to increase, decrease, or hold a next data rate in comparison with a data rate used in the previous time interval, depending on an RCB received from a base station. In this case, due to a delay between a time when the RCB is generated in a base station and a time when the RCB is actually applied in a mobile station, reverse rate control cannot be efficiently performed, leading to deterioration in data throughput of the entire system.

SUMMARY OF THE INVENTION

It is, therefore, an object of the present invention to provide a method and apparatus for controlling a reverse rate while considering a delay between a rate control bit (RCB) generation time by a base station and an RCB application time by a mobile station in a mobile communication system.

It is another object of the present invention to provide a method and apparatus for improving throughput of the entire system through efficient reverse rate control.

In accordance with an object of the present invention, a method for controlling an uplink transmission power in a mobile station of a mobile communication system is provided. The method includes: transmitting uplink data in a first transmission interval, receiving a transmission power control information over a downlink control channel, and determining a transmission power of uplink data to be transmitted in a second transmission interval. The transmission power is determined based on the received transmission power control information and a transmission power of the uplink data transmitted in the first transmission interval, and the first transmission interval and the second transmission interval are included in a same Hybrid Automatic Retransmission reQuest (HARQ) process.

In accordance with an object of the present invention, an apparatus for controlling an uplink transmission power in a mobile station of a mobile communication system is provided. The apparatus includes: a receiver for receiving a transmission power control information over a downlink control channel, a controller for determining a transmission power of uplink data to be transmitted based on the received transmission power control information and a transmission power of uplink data previously transmitted in a same Hybrid Automatic Retransmission reQuest (HARQ) process, and a transmitter for transmitting the uplink data according to the transmission power determined by the controller

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail herein below with reference to the annexed drawings. In the following description, a detailed description of known functions and configurations incorporated herein has been omitted for conciseness.

The present invention is directed to controlling a reverse data rate using a rate control bit (RCB), wherein a mobile communication system determines a reference time where a base station generates an RCB and a mobile station applies the RCB, taking a predetermined delay time into consideration. Herein, the "delay time" is referred to as "rate control delay (RCD)." Rate control based on the RCD is also expressed as rate control based on ACID (ARQ (Automatic Repeat reQuest) Channel Indicator). That is, in determining a data rate of a mobile station, an RCB is analyzed on the basis of a rate of packet data corresponding to a previous ACID and then a rate of transmission packet data corresponding to the same ACID is determined.

In addition, a method of controlling a data rate of a mobile station is actually equivalent to a method of controlling a TPR of a mobile station. Therefore, a description will be made of only the method for controlling a data rate of a mobile station by a base station. However, the method of controlling the TPR can also be applied to the rate control method proposed in the present invention.

Figure 3:
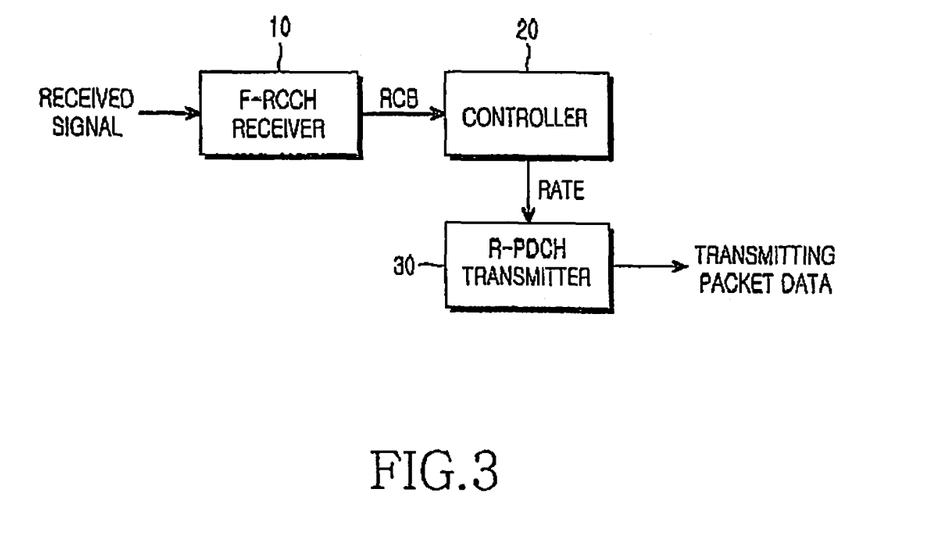
FIG. 3 is a block diagram illustrating an apparatus for controlling a reverse rate according to an embodiment of the present invention.

FIG. 3 is a block diagram illustrating an apparatus for controlling a reverse rate according to an embodiment of the present invention. As illustrated in FIG. 3, the rate control apparatus comprises a forward rate control channel (F-RCCH) receiver 10, a controller 20, and a reverse packet data channel (R-PDCH) transmitter 30. For each time interval, the F-RCCH receiver 10 receives an RCB by performing despreading, demodulation, and decoding on a signal received from a base station using a spreading code assigned to F-RCCH, and provides the received RCB to the controller 20.

The controller 20 analyzes a value of the RCB to determine whether a base station is requiring an increase in a reverse rate or a decrease in a reverse rate, and determines a new reverse rate according to the determination result. Then the R-PDCH transmitter 30 transmits a data frame according to the determined data rate, under the control of the controller 20. Here, the RCB is not a value determined by matching a rate for the next time interval to a previous time interval, but a value determined by matching the rate for the next time interval to a time interval that goes a predetermined rate control delay (RCD) ahead of the current time interval.

More specifically, assuming that a mobile station transmits one data frame for each time interval, the RCD is a delay from a time where an $i^{th}$ frame is transmitted when RCB determined based on the $i^{th}$ frame is received. The RCD is determined by an agreement between a base station and a mobile station when the base station and the mobile station initiate communication with each other. Alternatively, the RCD can be determined by a mobile station. In another case, the RCD can be determined by a base station and then notified to a mobile station. In yet another case, the RCD can be previously determined between a base station and a mobile station.

Accordingly, upon receiving an $i^{th}$ frame, a base station generates an RCB based on the received $i^{th}$ frame, and transmits the generated RCB over the R-RCCH. The mobile station receives the RCB, determines a rate of the next frame according to a rate of the $i^{th}$ frame, and transmits the next frame at the determined rate.

As described above, a rate is also controlled based on an ACID. Assuming that a mobile station sequentially transmits packet data corresponding to ACIDs having values of 00, 01, 10, and 11 for 4 different time intervals, and assuming that a rate of current packet data corresponding to ACID=00 is 19.2 Kbps and an RCB(+) is received, the mobile station can transmit the next packet data corresponding to ACID=00 at 38.4 Kbps. That is, in determining a rate of current transmission packet data, the mobile station determines a rate of the next transmission packet data based on a rate of previous packet data corresponding to the same ACID.

Figure 4:
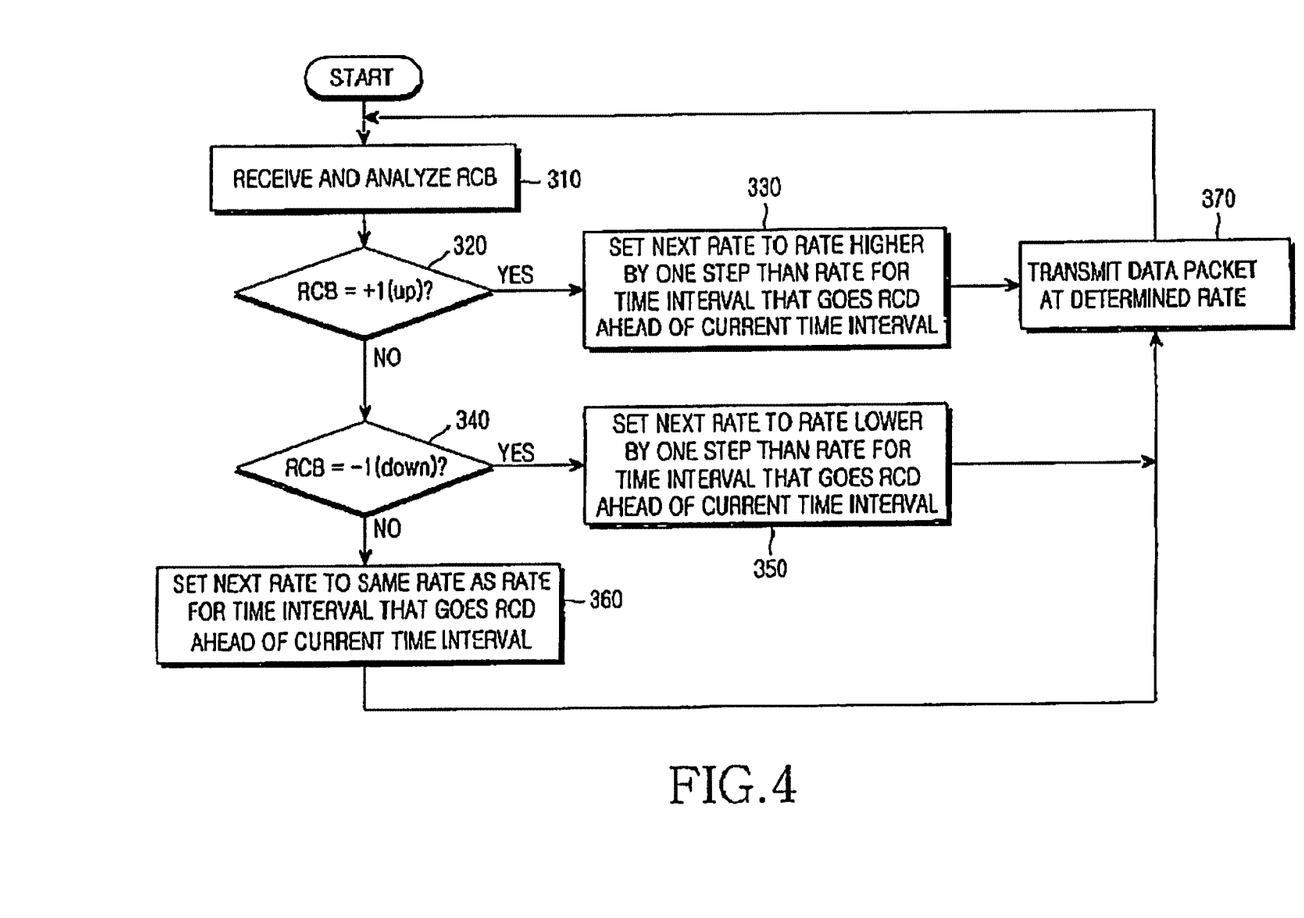
FIG. 4 is a flowchart illustrating an operation of determining a reverse rate by a mobile station according to an embodiment of the present invention.

FIG. 4 is a flowchart illustrating an operation of determining a reverse rate by a mobile station according to an embodiment of the present invention. The mobile station supports at least 9.6 Kbps, 19.2 Kbps, 38.4 Kbps, 76.8 Kbps, 153.6 Kbps, and 307.2 Kbps for R-PDCH, and increases, decreases, or holds a reverse rate step by step according to a rate control bit (RCB).

Referring to FIG. 4, in step 310, a mobile station receives and analyzes a rate control bit (RCB) for an $n^{th}$ time interval. In step 320, the mobile station determines whether a value of the RCB indicates 'rate up'. If a value of the rate control bit is '+1', indicating 'rate up', in step 330, the mobile station sets a rate R(n+1) to be used in the next time interval 'n+1' to a value (or rate), which is increased one step higher than a rate R(n−RCD) for a time interval occurring a predetermined RCD ahead of the current time interval, and then proceeds to step 370. This can be expressed as shown below in Equation 1.

$$R(n+1)=R(n-\text{RCD})++ \quad (1)$$

If it is determined in step 320 that a value of the RCB is not '+1', indicating 'rate up', in step 340, the mobile station determines whether a value of the RCB indicates 'rate down'. If it is determined that a value of the RCB is '−1', indicating 'rate down', in step 350, the mobile station sets a rate R(n+1) to be used in the next time interval 'n+1' to a value which is decreased one step lower than a rate R(n−RCD) for a time interval occurring a predetermined RCD ahead of the current time interval, and then proceeds to step 370. This can be expressed as shown below in Equation 2.

$$R(n+1)=R(n-\text{RCD})-- \quad (2)$$

If it is determined in step 340 that a value of the RCB is not '−1', indicating 'rate down', in step 360, the mobile station sets a rate R(n+1) to be used in the next time interval 'n+1' to the same value as a rate R(n−RCD) for a time interval occurring a predetermined RCD ahead of the current time interval. This can be expressed as shown below in Equation 3.

$$R(n+1)=R(n-\text{RCD}) \quad (3)$$

In step 370, the mobile station transmits a data frame in the next time interval 'n+1' according to the determined rate R(n+1).

In the present invention, a rate control delay (RCD) is a time required when a mobile station transmits one frame in a reverse direction considering a processing delay in a base station and a mobile station. Thereafter, a base station transmits an RCB in a forward direction, and the mobile station receives the RCB and applies the received RCB to a data rate of the next frame. The RCD is designated by the frame. For example, the RCD can be set with one or two frames.

Figure 5:
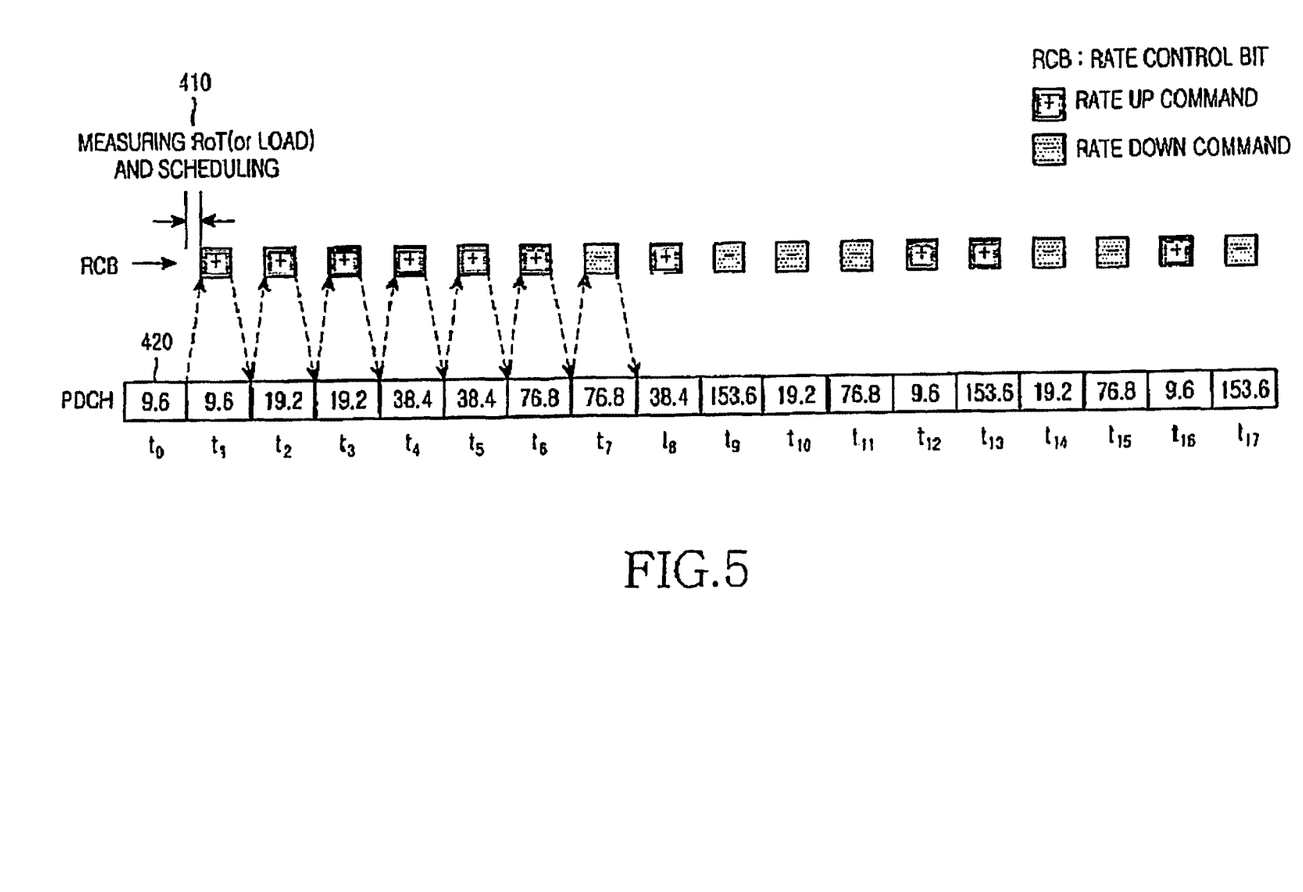
FIG. 5 is a timing diagram illustrating an operation of determining a reverse rate by a mobile station for RCD=1 frame (or 1 time interval) according to an embodiment of the present invention.

FIG. 5 is a timing diagram illustrating an operation of determining a reverse rate by a mobile station for RCD=1 frame (or 1 time interval) according to an embodiment of the present invention. Referring to FIG. 5, in a time interval t0, a mobile station transmits a data frame over PDCH at a rate of 9.6 Kbps (see 410). For a time interval t1, a base station determines whether to increase, decrease, or hold a data rate of the mobile station based on an RoT, a buffer status, and a power status of the mobile station, generates an RCB according to the determination result, and transmits the generated RCB (see 420).

The RCB is received at the mobile station in the time interval t1, and the mobile station determines a data rate to be applied in a time interval t2 according to the received RCB. In determining a data rate to be applied in the time interval t2, the mobile station determines the data rate not based on a rate for a previous time interval t1, but based on a rate for a time interval t0 that occurs a predetermined RCD, or one frame, ahead of the current time interval. Such rate control is called "interlaced rate control" because rate control is separately performed on even-numbered frames and odd-numbered frames as illustrated in FIG. 5.

For example, a mobile station uses a rate of 9.6 Kbps in a time interval t1. A base station determines to increase a rate of the mobile station according to status information of mobile stations in the time interval t1, generates RCB(+) according to the determination result, and transmits the generated RCB(+) to the mobile station. The RCB(+) is received at the mobile station in a time interval t2, and based on the received RCB(+), the mobile station sets a rate to be used in a time interval t3 to a rate 19.2 Kbps, which is increased one step higher than a rate 9.6 Kbps for the time interval t1, i.e., a time interval that occurs an RCD ahead of the current time interval.

As another example, a mobile station uses a rate of 38.4 Kbps in a time interval t5. A base station determines to increase a rate of the mobile station according to status information of mobile stations in the time interval t5, generates RCB(+) according to the determination result, and transmits the generated RCB(+) to the mobile station. The RCB(+) is received at the mobile station in a time interval t6, and based on the received RCB(+), the mobile station sets a rate to be used in a time interval t7 to a rate 76.8 Kbps, which is increased one step higher than a rate 38.4 Kbps for the time interval t5, i.e., a time interval that occurs an RCD ahead of the current time interval.

Figure 6:
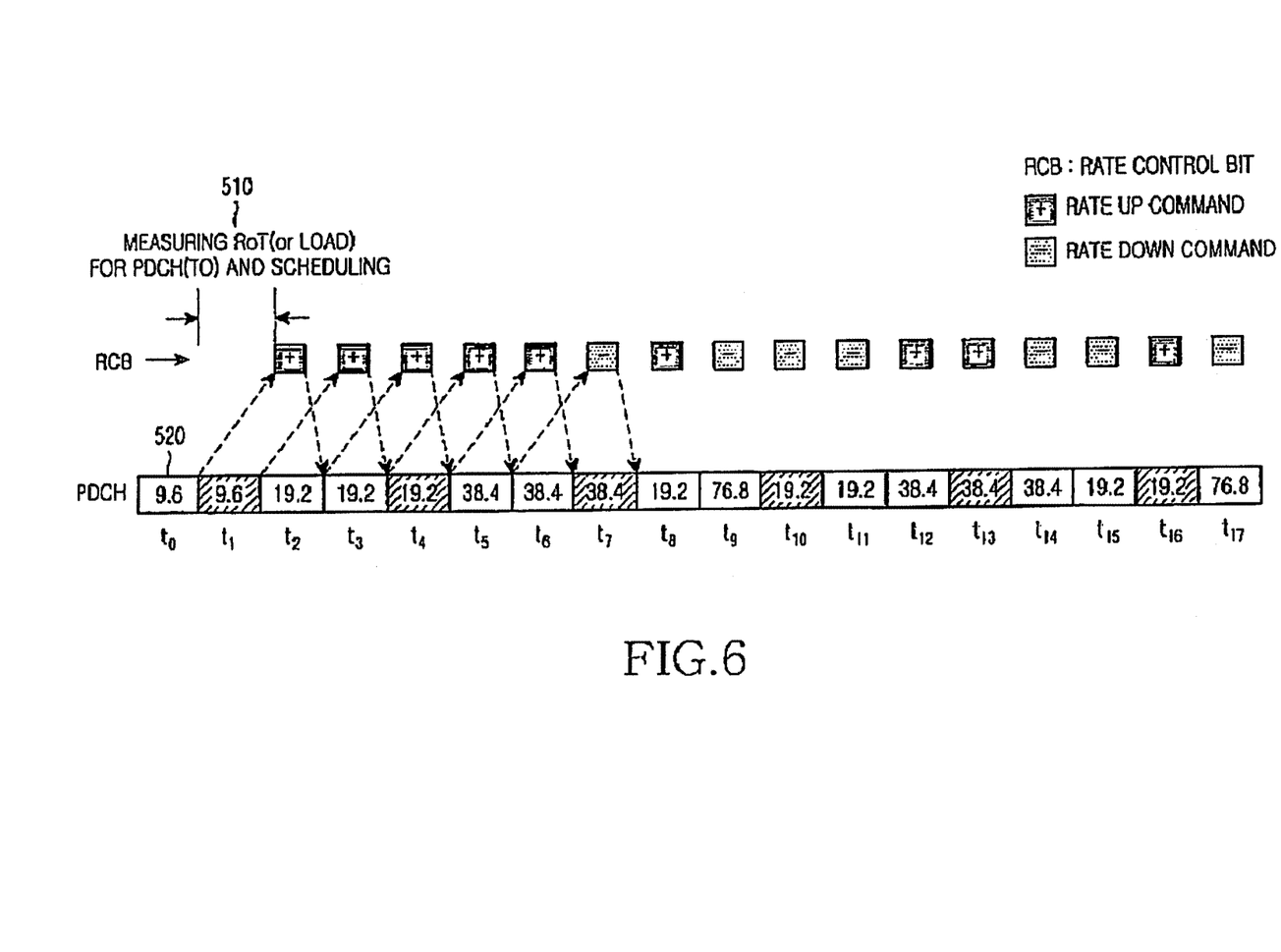
FIG. 6 is a timing diagram illustrating an operation of determining a reverse rate by a mobile station for RCD=2 frames (or 2 time intervals) according to an embodiment of the present invention.

FIG. 6 is a timing diagram illustrating an operation of determining a reverse rate by a mobile station for RCD=2 frames (or 2 time intervals) according to an embodiment of the present invention. Referring to FIG. 6, in a time interval t0, a mobile station transmits a data frame over PDCH at a rate of 9.6 Kbps (see 510). For a time interval t1, a base station determines whether to increase, decrease, or hold a data rate of the mobile station based on an RoT, a buffer status, and a power status of the mobile station, generates an RCB according to the determination result, and transmits the generated RCB (see 520).

The RCB is received at the mobile station in a time interval t2, and the mobile station determines a data rate to be applied in a time interval t3 according to the received RCB. In determining a data rate to be applied in the time interval t3, the mobile station determines the data rate not based on a rate for a previous time interval t2, but based on a rate for a time interval t0 that occurs a predetermined RCD, or 2 frames, ahead of the current time interval.

For example, a mobile station uses a rate of 9.6 Kbps in a time interval t1. A base station determines to increase a rate of the mobile station according to status information of mobile stations in the time interval t1, generates RCB(+) according to the determination result, and transmits the generated RCB(+) to the mobile station. The RCB(+) is received at the mobile station in a time interval t3, and based on the received RCB(+), the mobile station sets a rate to be used in a time interval t4 to a rate 19.2 Kbps, which is increased one step higher than a rate 9.6 Kbps for the time interval t1, i.e., a time interval that occurs an RCD ahead of the current time interval.

As another example, a mobile station uses a rate of 38.4 Kbps in a time interval t5. A base station determines to decrease a rate of the mobile station according to status information of mobile stations in the time interval t5, generates RCB(−) according to the determination result, and transmits the generated RCB(−) to the mobile station. The RCB(−) is received at the mobile station in a time interval t7, and based on the received RCB(−), the mobile station sets a rate to be used in a time interval t8 to a rate 19.2 Kbps, which is decreased one step lower than a rate 38.4 Kbps for the time interval t5, i.e., a time interval that occurs an RCD ahead of the current time interval.

In FIG. 5, because the RCD=1 frame, rate control is separately performed on two parts (even-numbered frames and odd-numbered frames). In FIG. 6, because the RCD=2 frames, rate control is separately performed on three parts (first frames, second frames, and third frames.

In the interlaced rate control method according to the present invention, a mobile station applies information for an increase (+), a decrease (−), or a hold (0) to an RCB, based on a rate used when a base station generates the RCB, so a reverse rate control error caused by a delay between a base station and a mobile station is removed. Therefore, using the interlaced rate control method, a mobile station accurately applies a rate calculated during scheduling by a base station, thereby efficiently controlling reverse rates of mobile stations.

In order to describe an operation of determining a reverse rate of a mobile station by applying the interlaced rate control method in a system using energy reduction technology, it is necessary to first describe Hybrid Automatic Retransmission Request (HARQ) technology.

The HARQ technology is commonly used to increase reverse throughput in a mobile communication system for wireless packet supporting a multimedia service. HARQ technology is technology performed on a physical layer packet. An operation of transmitting a frame in a reverse direction using such HARQ technology will now be described herein below.

A base station informs a mobile station whether a physical layer packet is successfully received, through a forward acknowledgement (ACK) channel in response to the physical layer packet received from the mobile station. If physical layer packet is successfully received, the base station transmits an ACK signal indicating successful receipt of the physical layer packet over an ACK channel. However, if reception of physical layer packet is failed, the base station transmits a negative acknowledgement (NAK) signal indicating reception failure of the physical layer packet over the ACK channel. The mobile station analyzes a signal received over the ACK channel to determine whether the physical layer packet has been successfully transmitted. If an ACK signal is received, the mobile station transmits a new packet, and if a NAK signal is received, the mobile station retransmits the previously transmitted packet.

If decoding of a packet previously received from the mobile station is failed, the base station combines the retransmitted packet with the previously received packet before attempting to decode, thereby contributing to an increase in a decoding success rate.

In a system using HARQ technology, a mobile station uses energy reduction technology in order to determine a reverse rate. In the energy reduction technology, when a mobile station attempts retransmission upon receipt of a NAK signal from a base station after performing initial transmission in a system using HARQ technology, energy of the retransmitted packet is set to a lower value than that of the initially transmitted packet. That is, in this technology, a traffic channel for the retransmitted packet has a lower gain than the initially transmitted packet.

Figure 7:
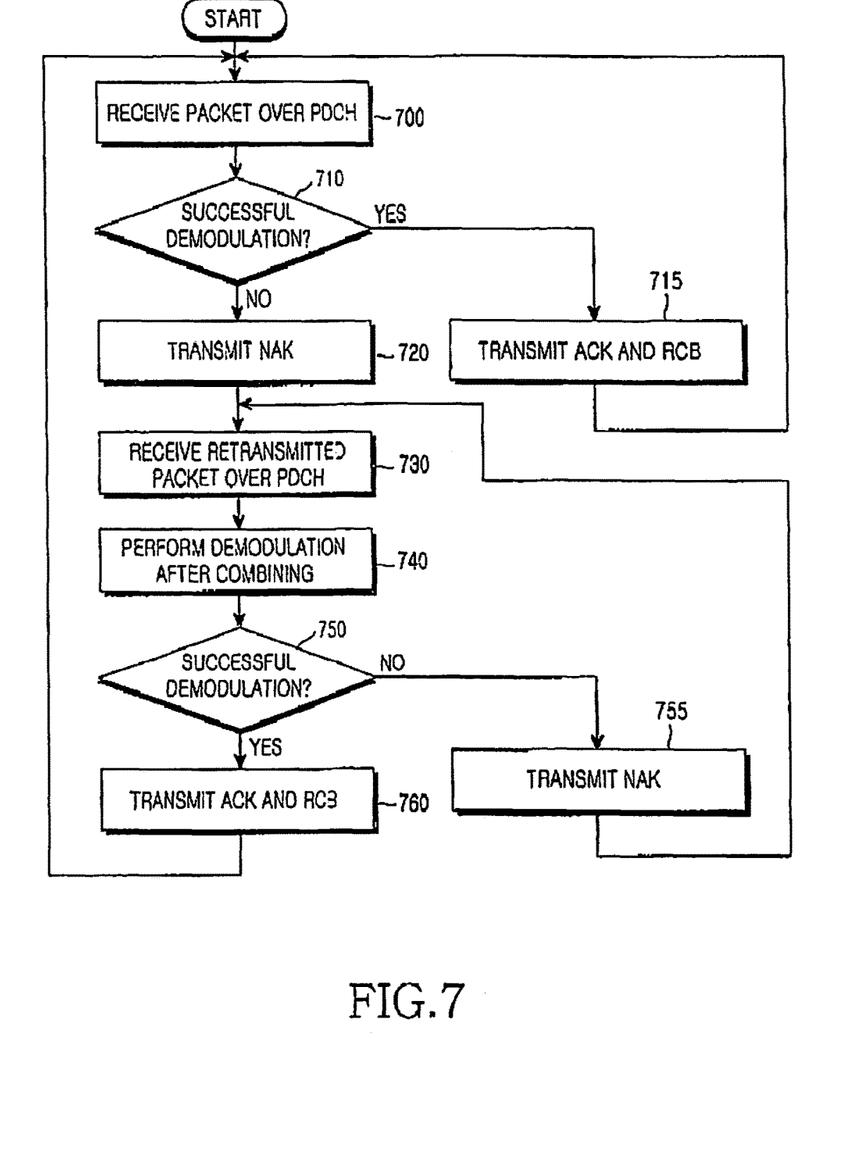
FIG. 7 is a flowchart illustrating an operation of a base station in a system employing HARQ technology and energy reduction technology according to another embodiment of the present invention.
Figure 8:
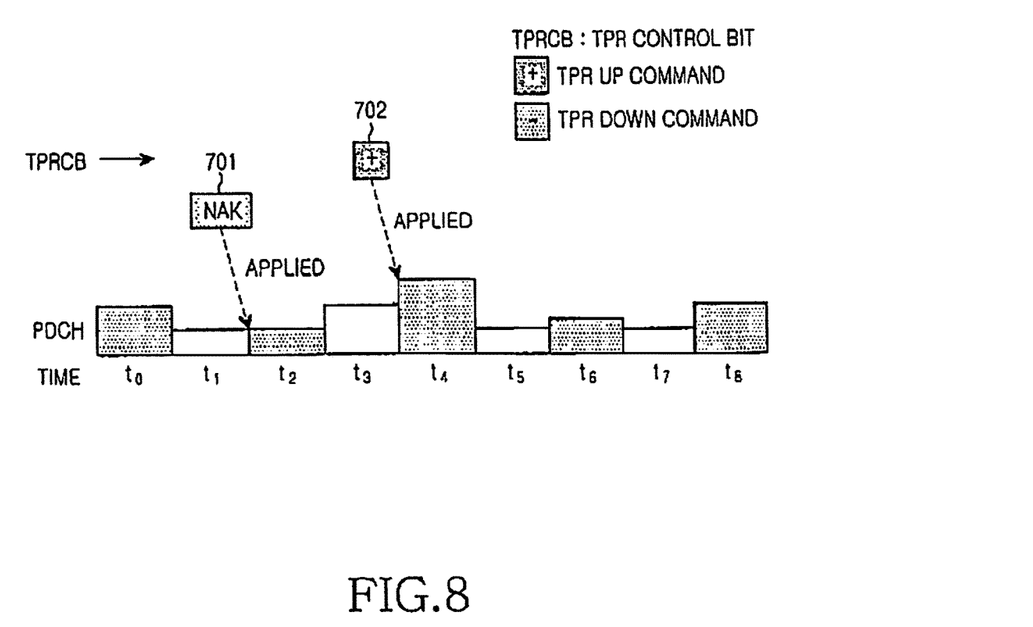
FIG. 8 is a timing diagram illustrating an operation of determining a reverse rate by a mobile station in a system employing HARQ technology and energy reduction technology according to another embodiment of the present invention.

FIG. 7 is a flowchart illustrating an operation of a base station in a system employing HARQ technology and energy reduction technology according to another embodiment of the present invention. FIG. 8 is a timing diagram illustrating an operation of determining a reverse rate by a mobile station in a system employing HARQ technology and energy reduction technology according to another embodiment of the present invention. In FIG. 8, the height of a packet data channel denotes a channel gain.

Referring to FIGS. 7 and 8, if a mobile station transmits a packet over PDCH for a time interval t0, in step 700, a base station receives the packet transmitted by the mobile station over the PDCH and attempts demodulation on the received packet. In step 710, the base station determines whether demodulation of the packet is successful. If it is determined that the demodulation is successful, in step 715, the base station transmits an ACK signal to the mobile station over an ACK channel in order to receive the next packet. Simultaneously, the base station transmits an RCB or a traffic-to-pilot power ratio control bit (TPRCB).

However, if it is determined that the demodulation has failed, in step 720, the base station transmits a NAK signal 701 to the mobile station over an ACK channel. At this time, the base station does not transmit RCB 702 because a data rate for a retransmission packet is not different from a data rate for an initially transmitted packet and TPR control is unnecessary.

Upon receiving the NAK signal 701, the mobile station attempts retransmission for a time interval t2. At this point, as illustrated in FIG. 8, a packet retransmitted over PDCH for the time interval t2 is applied the energy reduction technology. Therefore, RCB 702 is not received from the base station, and the retransmitted packet is lower in energy than a packet initially transmitted for the time interval t0. Transmission energy of the retransmitted packet can be reduced to ½ or ¼ compared with that of the initially transmitted packet.

In step 730, the base station receives the retransmitted packet from the mobile station over PDCH for the time interval t2. In step 740, the base station combines the initially transmitted packet received for the time interval t0, i.e., a packet received for a time interval that occurs two RCDs ahead of the current time interval, with the currently retransmitted packet and demodulates the combined packet. Thereafter, in step 750, the base station determines whether the demodulation is successfully achieved. If it is determined that the demodulation has failed, the base station transmits a NAK signal in step 755, and then returns to step 730 to receive the retransmitted packet.

For the convenience of explanation, in FIG. 7, the base station continues to wait for a retransmitted packet when it transmits a NAK signal in step 755. Actually, however, the base station stops retransmission when the number of retransmissions exceeds a predetermined retransmission number. Preferably, the predetermined retransmission number is set to 3 or lower, including the initial transmission.

If it is determined in step 750 that the retransmitted packet is successfully demodulated, in step 760, the base station, although not illustrated in FIG. 8, transmits an ACK signal for the time interval t2 to inform the mobile station that the packet has been successfully received. At the same time, the base station transmits RCB 702 in order to control a rate or TPR of the mobile station.

A description will now be made of an operation of controlling a reverse rate or TPR by a mobile station in a system employing HARQ technology and energy reduction technology. It should be noted that the operation is identical in principle to the operation described in connection with FIGS. 5 and 6.

Referring back to FIG. 8, upon receiving RCB 702, a mobile station determines whether to increase, decrease, or hold a data rate or TPR according to a command of the RCB 702. The mobile station controls a rate or TPR of a packet to be transmitted for a time interval t4, based on information on rate up/down/hold for a packet transmitted for a time interval t2. Because an RCD corresponds to two time intervals as illustrated in FIG. 5, the mobile station follows the operation described in connection with FIG. 5. Therefore, a detailed description thereof will be omitted for simplicity. In this case, an operation of controlling a reverse rate by a mobile station is identical to the operation described in connection with FIG. 4.

However, in an alternative method, a mobile station can control a rate or TPR of a packet to be transmitted for a time interval t4 based on information on up/down/hold for a packet transmitted for a time interval t0. Here, when the mobile station controls a rate or TPR of a packet to be transmitted for a time interval t4 based on information on up/down/hold for a packet transmitted for a time interval t0, such an operation should not violate an operational principle of the embodiment described in connection with FIGS. 5 and 6. More specifically, because the energy reduction technology is used, gains of respective packet data channels are set to different values, but packets transmitted for time intervals t0 and t2 by the mobile station have the same rate. Therefore, based on a rate for the packet transmitted for the time interval t0, a rate for the time interval t4 is increased according to RCB(+) 702.

In a system not employing the energy reduction technology, a mobile station, based on the method proposed by the present invention, always increases, decreases, or holds a rate based on a packet transmitted for a time interval that occurs an RCD head of the current time interval.

In addition, although a base station transmits a TPRCB, a mobile station increases, decreases, or holds a rate of a packet to be currently transmitted not based on a rate caused by TPR during retransmission for a time interval t2, but based on a rate caused by TPR during initial transmission for a time interval t0.

Figure 9:
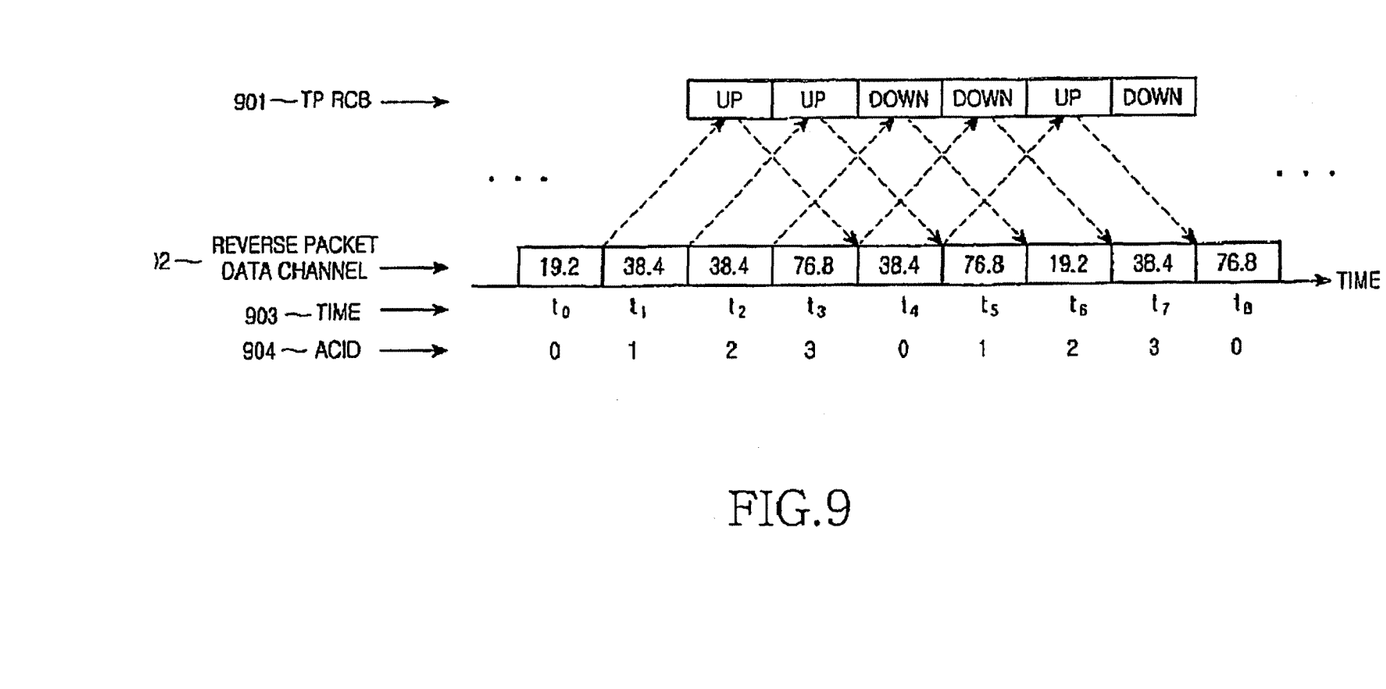
FIG. 9 is a diagram illustrating a method for controlling a TPR for each HARQ channel according to an embodiment of the present invention.

FIG. 9 is a diagram illustrating a method for controlling a TPR for each HARQ channel according to an embodiment of the present invention.

In a common HARQ operation, there are several HARQ channels and each HARQ channel is identified by an ARQ Channel Identifier (ACID). For example, if there are 4 HARQ channels, the HARQ channels correspond to ACID=0, ACID=1, ACID=2, and ACID=3, respectively, and an HARQ operation is independently performed for each ACID. Though the specification describes the HARQ channel as a different channel by separating each ACID, the HARQ channel can be each different frame of one packet data channel. For better understanding, an operation of a conventional HARQ system using a frame length of 10 ms will be described in detail herein below.

A mobile station transmits initial transmission packets over a series of HARQ channels beginning at a particular start time t=0. That is, at t=0, the mobile station transmits initial transmission packet data over an ACID=0 HARQ channel, which is a first HARQ channel. At t=10 ms, the mobile station transmits initial transmission packet data over an ACID=1 HARQ channel, which is a second HARQ channel. At t=20 ms, the mobile station transmits initial transmission packet data over an ACID=2 HARQ channel, which is a third HARQ channel. At t=30 ms, the mobile station transmits initial transmission packet data over an ACID=3 HARQ channel, which is a fourth HARQ channel.

The mobile station receives an ACK or NAK signal from a base station in response to the initial transmission packet transmitted over the ACID=0 HARQ channel, and if NAK is received, the mobile station performs retransmission through the ACID=0 HARQ channel at t=40 ms. If NAK is received from the base station in response to the initial transmission packet transmitted over ACID=1 HARQ channel, the mobile station retransmits the packet over the ACID=1 HARQ channel at t=50 ms.

As described above, a common HARQ operation is performed using several HARQ channels. The interlaced rate control method proposed in the present invention is equivalent to controlling a rate of a mobile station or a TPR of a mobile station for each HARQ channel, or ACID, in the HARQ operation. Because in the HARQ operation, a rate control delay (RCD) is defined by a time period between HARQ channels corresponding to the same ACID, controlling a rate or a TPR for each HARQ channel corresponding to the same ACID is equivalent to controlling a rate for a time interval occurring a RCD ahead of a current time interval according to a received rate control bit (RCB).

As indicated above, FIG. 9 illustrates a procedure for controlling a TPR for each HARQ channel, or ACID. For example, in FIG. 9, the number of HARQ channels is 4. Therefore, as illustrated in FIG. 9, ACID=0, 1, 2, and 3. For the convenience of explanation, in FIG. 9, response signals such as ACK or NAK for supporting HARQ are omitted. Although the ACK or NAK is applied, the rate control operation of FIG. 9 is performed in the same manner except that a retransmission packet is transmitted in response to NAK.

In order to perform a TPR control operation for each HARQ channel, or ACID, as described in connection with FIG. 9, the mobile station can use an internal parameter authorized_tpr. The authorized_tpr is a parameter managed by the mobile station to update its maximum TPR value allowed by the base station in order to control its own rate, and this is updated for each ACID. Therefore, in FIG. 9, the authorized_tpr becomes arrangement size of 4 as authorized_tpr[4]. Here, authorized_tpr[0] is used for TPR control by a mobile station for ACID=0 HARQ channel, authorized_tpr[1] is used for TPR control by a mobile station for ACID=1 HARQ channel, authorized_tpr[2] is used for TPR control by a mobile station for ACID=2 HARQ channel, and authorized_tpr[3] is used for TPR control by a mobile station for ACID=3 HARQ channel.

In FIG. 9, reference numeral 901 denotes a series of TPRCBs transmitted from a base station to a mobile station, and reference numeral 902 denotes a series of R-PDCHs transmitted in a reverse direction by a mobile station. Further, numerals 19.2 and 38.4 denote data rates in a unit of Kbps. Moreover, in FIG. 9, reference numeral 903 denotes an identifier for passage of a time in a unit of 10 ms, and reference numeral 904 denotes ACID, which is an identifier for each HARQ channel.

Referring to FIG. 9, a mobile station transmits a 19.2-Kbps packet over an ACID=0 HARQ channel at t=t0. The mobile station sets a value of authorized_tpr[0] to a TPR value corresponding to 19.2 Kbps. The mobile station transmits a 38.4-Kbps packet over an ACID=1 HARQ channel at t=t1. The mobile station sets a value of authorized_tpr[1] to a TPR value corresponding to 38.4 Kbps, and transmits a 38.4-Kbps packet over an ACID=2 HARQ channel at t=t2. Further, the mobile station sets a value of authorized_tpr[2] to a TPR value corresponding to 38.4 Kbps. In addition, the mobile station receives a TPRCB indicating 'UP' from the base station at t=t2.

Therefore, the mobile station updates a value of authorized_tpr[0] to a TPR value corresponding to 38.4 Kbps. Because the mobile station transmitted a 19.2-Kbps packet over the ACID=0 HARQ channel and then received a TPRCB indicating 'UP' in response thereto, the mobile station increases authorized_tpr[0] corresponding to the same ACID by one step.

The mobile station transmits a 76.8-Kbps packet over an ACID=3 HARQ channel at t=t3, and sets a value of authorized_tpr[3] to a TPR value corresponding to 76.8 Kbps. In addition, the mobile station receives a TPRCB indicating 'UP' from the base station at t=t3. Therefore, the mobile station updates a value of authorized_tpr[1] to a TPR value corresponding to 76.8 Kbps. Because the mobile station transmitted a 38.4-Kbps packet over the ACID=1 HARQ channel and then received a TPRCB indicating 'UP' in response thereto, the mobile station increases authorized_tpr[1] corresponding to the same ACID by one step.

In controlling a rate or a TPR of a packet to be transmitted over an ACID=0 HARQ channel at t=t4, because a value of authorized_tpr[0] is a value corresponding to 38.4 Kbps, the mobile station can transmit a 38.4-Kbps packet. In FIG. 9, the mobile station transmits a 38.4-Kbps packet. Such an operation is continuously repeated. As described above, the mobile station controls a TPR for each HARQ channel, or ACID. In addition, as illustrated in FIG. 9, the mobile station can control its own TPR value for each HARQ channel using the internal parameter authorized_tpr.

There is a current transmission packet data frame corresponding to the same ACID among a plurality of previous transmission packet data frames and there is a rate of the corresponding packet data frame. As described above, a rate of a packet data frame can be used in the same expression as a TPRCB. Here, a TPRCB allowed for a rate of a previous transmission packet data frame will be referred to as TPRCB{ACID(P)}, where P stands for 'previous'.

In addition, a rate of a next transmission packet data frame will be referred to as TPRCB{ACID(N)}, where N stands for 'next'. The mobile station determines whether to increase, decrease, or hold a rate based on control information received from a base station.

The foregoing description, i.e., a method for transmitting a current packet data frame using an ACID can be expressed as shown below in Equation 4.

$$\text{TPRCB}\{\text{ACID}(N)\} = \text{TPRCB}\{\text{ACID}(P)\} + \text{Delta} \tag{4}$$

That is, a rate of current transmission packet data is increased or decreased by Delta on the basis of a rate of a packet data frame corresponding to the same ACID among the previous transmission packet data frames. Here, "Delta" refers to a value increased or decreased base on control information received from a base station.

As can be appreciated from the foregoing description, a mobile station applies an RCB based on a rate used when a base station generates the RCB, thereby preventing a reverse rate control error caused by a processing delay between the base station and the mobile station. Therefore, using the interlaced rate control method according to the present invention, a mobile station accurately applies a rate calculated during scheduling by a base station, thereby efficiently controlling reverse rates of mobile stations.

While the present invention has been shown and described with reference to a certain preferred embodiment thereof, it will be understood by those skilled in the art that various changes in form and details may be made therein without departing from the spirit and scope of the present invention as defined by the appended claims.

What is claimed is:

1. A method for controlling an uplink traffic-to-pilot power ratio (TPR) in a mobile station (MS) using an automatic repeat request (ARQ) technology in a communication system, the method comprising:
   receiving, by the MS, TPR control information over a downlink control channel;
   determining, by the MS, an allowed maximum TPR of uplink data to be transmitted in a second transmission interval, the allowed maximum TPR being determined by applying a value indicating to increase or decrease a used TPR in a first transmission interval to the used TPR in the first transmission interval according to the TPR control information; and
   controlling, by the MS, a TPR of the uplink data to be transmitted in the second transmission interval based on the determined allowed maximum TPR,
   wherein the first transmission interval is a previous transmission interval which has a same ARQ channel indicator (ACID) with the second transmission interval, and
   wherein the allowed maximum TPR of the uplink data to be transmitted in the second transmission interval is determined by:

$$TPRCB\{ACID(N)\}=TPRCB\{ACID(P)\}+Delta$$

where $TPRCB\{ACID(P)\}$ is a TPRCB (Traffic-to-Pilot power Ratio Control Bit) corresponding to the used TPR in the first transmission interval,
   $TPRCB\{ACID(N)\}$ is a TPRCB corresponding to the allowed maximum TPR of the uplink data to be transmitted in the second transmission interval, and
   Delta is the value indicating to increase or decrease the used TPR in the first transmission interval according to the TPR control information.

2. The method of claim 1, further comprising transmitting the uplink data in the second interval according to the controlled TPR.

3. The method of claim 1, further comprising determining whether to increase or to decrease the used TPR in the first transmission interval, based on the received TPR control information.

4. The method of claim 1, wherein the received TPR control information includes information indicating an increase or decrease of the maximum TPR value allowed by a base station.

5. The method of claim 1, wherein transmission intervals for the same HARQ process each include a same Automatic Repeat reQuest (ARQ) Channel InDicator (ACID).

6. The method of claim 1, wherein the first transmission interval and the second transmission interval are not consecutive time intervals.

7. An apparatus in a mobile station (MS) using an automatic repeat request (ARQ) technology in a communication system for controlling an uplink traffic-to-pilot power ratio (TPR), the apparatus comprising:
   a receiver for receiving TPR control information over a downlink control channel; and
   a processor for determining an allowed maximum TPR of uplink data to be transmitted in a second transmission interval, the allowed maximum TPR being determined by applying a value indicating to increase or decrease a used TPR in a first transmission interval to the used TPR in a first transmission interval according to the TPR control information, and controlling a TPR of the uplink data to be transmitted in the second transmission interval based on the determined allowed maximum TPR,
   wherein the first transmission interval is a previous transmission interval which has a same ARQ channel indicator (ACID) with the second transmission interval, and
   wherein the processor determines the allowed maximum TPR of the uplink data to be transmitted in the second transmission interval in accordance with:

$$TPRCB\{ACID(N)\}=TPRCB\{ACID(P)\}+Delta$$

where $TPRCB\{ACID(P)\}$ is a Traffic-to-Pilot power Ratio Control Bit (TPRCB) corresponding to the used TPR in the first transmission interval,
   $TPRCB\{ACID(N)\}$ is a TPRCB corresponding to the allowed maximum TPR of the uplink data to be transmitted in the second transmission interval, and
   Delta is the value indicating to increase or decrease the used TPR in the first transmission interval according to the TPR control information.

8. The apparatus of claim 7, wherein the processor determines whether to increase or decrease the used TPR in the first transmission interval, based on the received TPR control information.

9. The apparatus of claim 7, wherein the received TPR control information includes information indicating an increase or decrease of the maximum TPR value allowed by a base station.

10. The apparatus of claim 7, further comprising:
    a transmitter for transmitting the uplink data in the second interval according to the controlled TPR.

11. The apparatus of claim 7, wherein transmission intervals for the same HARQ process each include a same Automatic Repeat reQuest (ARQ) Channel InDicator (ACID).

12. The apparatus of claim 7, wherein the first transmission interval and the second transmission interval are not consecutive time intervals.

* * * * *